United States Patent
Okada

(10) Patent No.: US 7,820,240 B2
(45) Date of Patent: Oct. 26, 2010

(54) PRODUCTION PROCESS OF FILM AND COLUMN FOR CATION CHROMATOGRAPHY

(75) Inventor: Yoshiji Okada, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 1629 days.

(21) Appl. No.: 10/527,066

(22) PCT Filed: Sep. 11, 2003

(86) PCT No.: PCT/JP03/11636

§ 371 (c)(1),
(2), (4) Date: Mar. 9, 2005

(87) PCT Pub. No.: WO2004/024325

PCT Pub. Date: Mar. 25, 2004

(65) Prior Publication Data

US 2006/0054542 A1    Mar. 16, 2006

Related U.S. Application Data

(60) Provisional application No. 60/411,078, filed on Sep. 17, 2002.

(30) Foreign Application Priority Data

Sep. 11, 2002   (JP) .............................. 2002-265141

(51) Int. Cl.
- B05D 7/00 (2006.01)
- B05D 1/18 (2006.01)
- B32B 9/04 (2006.01)
- B01D 15/00 (2006.01)

(52) U.S. Cl. ................. 427/212; 427/430.1; 428/411.1; 210/263

(58) Field of Classification Search .................... 427/212
See application file for complete search history.

(56) References Cited

U.S. PATENT DOCUMENTS 4,507,411 A * 3/1985 Gordon et al. .............. 523/436

(Continued)

FOREIGN PATENT DOCUMENTS

EP           0 448 302 A        9/1991

(Continued)

OTHER PUBLICATIONS

Kolla et al., "Polymer-Coated Cation-Exchange Stationary Phases on the Basis of Silica," Chromatographia, 23, 7, pp. 465-472.*

(Continued)

* cited by examiner

Primary Examiner—Michael Cleveland
Assistant Examiner—Robert Vetere
(74) Attorney, Agent, or Firm—Sughrue Mion, PLLC

(57) ABSTRACT

One object of the present invention is to produce a weakly acidic cation exchanger under mild conditions. Another object of the present invention is to produce a more firm weakly acidic cation exchange film. Still another object of the present invention is to provide a weakly acidic cation exchanger capable of realizing high-level separation of monovalent cation and simultaneously analyzing monovalent cation and divalent cation and also provide a chromatography column using the ion exchanger. In the production method of a weakly acidic cation exchanger of the invention, a solvent incapable of dissolving a polymer having a double bond within the molecule is used and the weakly acidic cation exchanger is produced by polymerization at temperature of 100¿? ° C. or less. When an α,β-unsaturated dibasic acid derivative is dissolved in the solvent, the α,β-unsaturated dibasic acid derivative reacts with the polymer and a more firm film can be formed. Furthermore, when the weakly acidic cation exchanger obtained by this process is packed in a column, monovalent cation can be separated in high level.

11 Claims, 3 Drawing Sheet

U.S. PATENT DOCUMENTS

| | | | |
|---|---|---|---|
| 4,913,935 | A | 4/1990 | Lin |
| 5,875,994 | A | 3/1999 | McCrory |
| 5,968,363 | A | 10/1999 | Riviello et al. |

FOREIGN PATENT DOCUMENTS

| | | | |
|---|---|---|---|
| GB | 1 446 783 A | | 8/1976 |
| JP | 49-4059 B | | 1/1974 |
| JP | 60-21372 B2 | | 5/1985 |
| JP | 05-096184 | * | 4/1993 |
| JP | 5-96184 A | | 4/1993 |
| JP | 8-257419 A | | 10/1996 |

OTHER PUBLICATIONS

Hanson M Et Al: "Non-porous polybutadiene-coated silicas as stationary phases in reversed-phase chromatography" Journal of Chromatography, Elsevier Science Publishers B.V, NL, vol. 517, Sep. 26, 1990, pp. 269-284.

P. Kolla/J. Köhler/G. Schomburg; Polymer-Coated Cation-Exchange Stationary Phases on the Basis of Silica; Chromatographia; vol. 23, No. 7, pp. 465-472, Jul. 1987.

Database WPI Section Ch, Week 199408 Derwent Publications Ltd., London, GB; An 1994-062605 XP002267618.

Database WPI Section Ch, Week 199320 Derwent Publications Ltd., London, GB; An 1993-163733 XP002267619.

PRODUCTION PROCESS OF FILM AND COLUMN FOR CATION CHROMATOGRAPHY

CROSS REFERENCE OF THE RELATED APPLICATION

This application is an application filed under 35 U.S.C. §111(a) claiming pursuant to 35 U.S.C. §119(e) of the filing date of Provisional Application 60/411,078 on Sep. 17, 2002, pursuant to 35 U.S.C. §111(b).

TECHNICAL FIELD

The present invention relates to a production process of a film having a structure containing a characteristic functional group in a high density. Particularly, the present invention relates to a production process of a weakly acidic cation exchanger where a film produced by the present invention is formed on a spherical fine particle, more specifically, a production process of a weakly acidic cation exchanger for use in cation chromatography, which is packed in a separation column and can measure a monovalent cation and a divalent cation at the same time.

BACKGROUND ART

As the packing material capable of measuring a monovalent cation and a divalent cation at the same time in cation chromatography, a weakly acidic cation exchanger produced by forming a film of poly(butadiene-maleic acid) (hereinafter, sometimes referred to as PBDMA) on a porous silica gel and then heating it at 180° C. for 4 hours is known (see, *Chromatographia*, Vol. 23, No. 7, pp. 465-472 (1987)).

However, the weakly acidic cation exchanger obtained by this method is insufficient in the adhesion between the silica gel support and a resin produced from the PBDMA film and has a problem in that the reproducibility is poor.

For solving this problem, a weakly acidic cation exchanger obtained by coating a weakly acidic cation exchange composition comprising a copolymer-crosslinked product of a vinyl compound with an unsaturated carboxylic acid and an unsaturated carboxylic acid anhydride-diene monomer copolymer has been proposed (see, JP-A-5-96184 (the term "JP-A" as used herein means an "unexamined published Japanese patent application")). This is a method where in forming a film on the surface of a spherical fine particle support, a compound having a vinyl group as the functional group is present together and a PBDMA copolymer-crosslinked product is produced at a high temperature, whereby the durability is enhanced.

According to the production method of a packing material reported in these two publications, a fine particle containing an organic material need be heated at a high temperature at the polymerization and therefore, these production methods are not suitable for use in industry.

JP-A-8-257419 proposes a packing material for cation chromatography, which is obtained by coating a cured product of a polyfunctional carboxylic acid compound and a polyfunctional epoxy compound on the surface of a porous support. In this publication, it is reported that a column improved in durability is obtained, however, since an ester bond is contained in the structure containing a functional group, problems such as deterioration due to hydrolysis are thought to occur.

Furthermore, improvement in the separation of monovalent cation, particularly sodium ion and ammonium ion, is not a purpose in all of these techniques proposed and the separation of these cations is insufficient.

Apart from these, a technique for improving the separation of sodium ion and ammonium ion has been reported (see, U.S. Pat. No. 5,968,363 and U.S. Pat. No. 5,875,994), where a crown ether or a functional group having a structure analogous thereto is introduced into a porous organic polymer particle to retard the elution of particularly potassium and ammonium and thereby improve the separation of sodium ion and ammonium ion. The purpose is satisfactorily achieved, however, this column is deficient in that the peak shape of particularly potassium is worsened and a solution containing an organic solvent need be used for the eluent.

Furthermore, a case of graft-polymerizing a copolymer consisting of maleic anhydride and ethyl vinyl ether to a polystyrene-base substrate is reported in Examples of these publications. Generally, according to a method using graft polymerization, a functional group may be surely introduced in a large amount, however, the polymer chain of copolymer introduced by this method mostly extends in the direction perpendicular to the base material surface and the film thickness increases in the portion containing a functional group on a support. Therefore, when the amount of a functional group introduced is increased, the packing pressure in column may increase or the separation efficiency of column may decrease.

As the column for use in a suppressor system, Ionpac CS16 (trade name) is commercially available from Dionex. In this column, a packing material for cation chromatography having a carboxyl group/a phosphonic acid group is packed and the separation of monovalent cation, particularly sodium ion and ammonium ion, is improved. However, this is a column for a suppressor system using an eluent having a concentration as high as 30 mmol methanesulfonic acid.

Under these circumstances, a weakly acidic cation exchanger which can realize high-level separation of monovalent cation in an appropriate eluent concentration condition and which can be used for the simultaneous analysis of monovalent and divalent cations, is being demanded.

In general, a packing material having a carboxyl group is used as the packing material for cation chromatography which is used for the simultaneously analysis of monovalent and divalent cations. The amount of the carboxyl group is considered to be suitably from 500 to 3,000 μeq/g, because if the amount is less than 500 μeq/g, satisfactory separation cannot be obtained, whereas if it exceeds 3,000 μeq/g, the elution of ion is excessively retarded. For obtaining good separation of ion, this may be attained by increasing the amount of the substituent introduced as much as possible, however, according to conventional methods for introducing a substituent, the increase in the amount of the substituent often affects the support shape, as a result, the separation is worsened.

As for the technique of reacting a polymer compound having a double bond with a maleic anhydride, an electrophoretic coating method using a compound obtained by derivatizing a product resultant from a reaction of a butadiene copolymer and a maleic anhydride, and an aqueous dispersion solution for photographic coating solutions, obtained by reacting a compound resultant from a reaction of butadiene with a maleic anhydride have been reported (see, for example, JP-B-49-4059 (the term "JP-B" as used herein means an "examined Japanese patent publication") and JP-B-60-

21372). However, the production example of a weakly acidic cation exchanger is only that described in JP-A-8-257419.

DISCLOSURE OF THE INVENTION

One object of the present invention is to produce a weakly acidic cation exchanger under mild conditions. Another object of the present invention is to produce a more firm weakly acidic cation exchange film. Still another object of the present invention is to provide a weakly acidic cation exchanger capable of realizing high-level separation of monovalent cation and simultaneously analyzing monovalent cation and divalent cation and also provide a chromatography column using the ion exchanger.

As a result of studies on the production method of a weakly acidic cation exchanger, the present inventors have found that when a polymer having a double bond within the molecule is polymerized by using a solvent in which the polymer does not dissolve, a weakly acidic cation exchanger can be produced under relatively mild conditions, and further found that when an $\alpha,\beta$-unsaturated dibasic acid derivative is dissolved in that solvent, the $\alpha,\beta$-unsaturated dibasic acid derivative reacts and a more firm film can be formed. It has been also found that when the weakly acidic cation exchanger obtained by this method is packed in a column, monovalent cation is separated in a high level. The present invention has been accomplished based on these findings.

That is, the present invention comprises, for example, the following matters.

[1] A film production process comprising the following steps (1) and (2):

Step (1):
a step of coating a polymer having a double bond within the molecule on a support, and Step (2):
a step of placing the support coated with the polymer in a solvent incapable of dissolving the polymer coated, to cause a crosslinking reaction of the double bond within the molecule and thereby form a film.

[2] The film production process as described in [1], wherein an $\alpha,\beta$-unsaturated dibasic acid derivative is present in the solvent used in the step (2).

[3] The film production process as described in [2], wherein in the step (2), the polymer having a double bond within the molecule reacts with the $\alpha,\beta$-unsaturated dibasic acid derivative.

[4] The film production process as described in [1], wherein the polymer having a double bond within the molecule is an unsaturated carboxylic acid-diene monomer copolymer and/or an unsaturated carboxylic anhydride-diene monomer copolymer.

[5] The film production process as described in [1], wherein the polymer having a double bond within the molecule is a poly(butadiene-maleic acid) and/or a poly(butadiene-maleic anhydride).

[6] The film production process as described in [2] or [3], wherein the polymer having a double bond within the molecule is one or more member selected from an unsaturated carboxylic acid-diene monomer copolymer, an unsaturated carboxylic anhydride-diene monomer copolymer, a butadiene copolymer and a polybutadiene.

[7] The film production process as described in [2] or [3], wherein the polymer having a double bond within the molecule is one or more member selected from a poly(butadiene-maleic acid), a poly(butadiene-maleic anhydride) and a polybutadiene.

[8] The film production process as described in any one of [2], [3], [6] and [7], wherein the $\alpha,\beta$-unsaturated dibasic acid derivative is a maleic anhydride and/or maleimide.

[9] The film production process as described in [8], wherein the $\alpha,\beta$-unsaturated dibasic acid derivative is a maleic anhydride.

[10] The film production process as described in any one of [1] to [9], wherein the support is a spherical porous particle having a particle size of 1 to 30 µm.

[11] The film production process as described in [10], wherein the spherical porous particle is a silica gel or a polyvinyl ether gel.

[12] The film production process as described in [1] to [11], wherein the film is a weakly acidic cation exchanger.

[13] A film produced by the production process in any one of [1] to [12].

[14] A weakly acidic cation exchanger produced by the production process in any one of [1] to [12].

[15] A column for cation chromatography, using the weakly acidic cation exchanger of [14].

MODE FOR CARRYING OUT THE INVENTION

Figure 1:
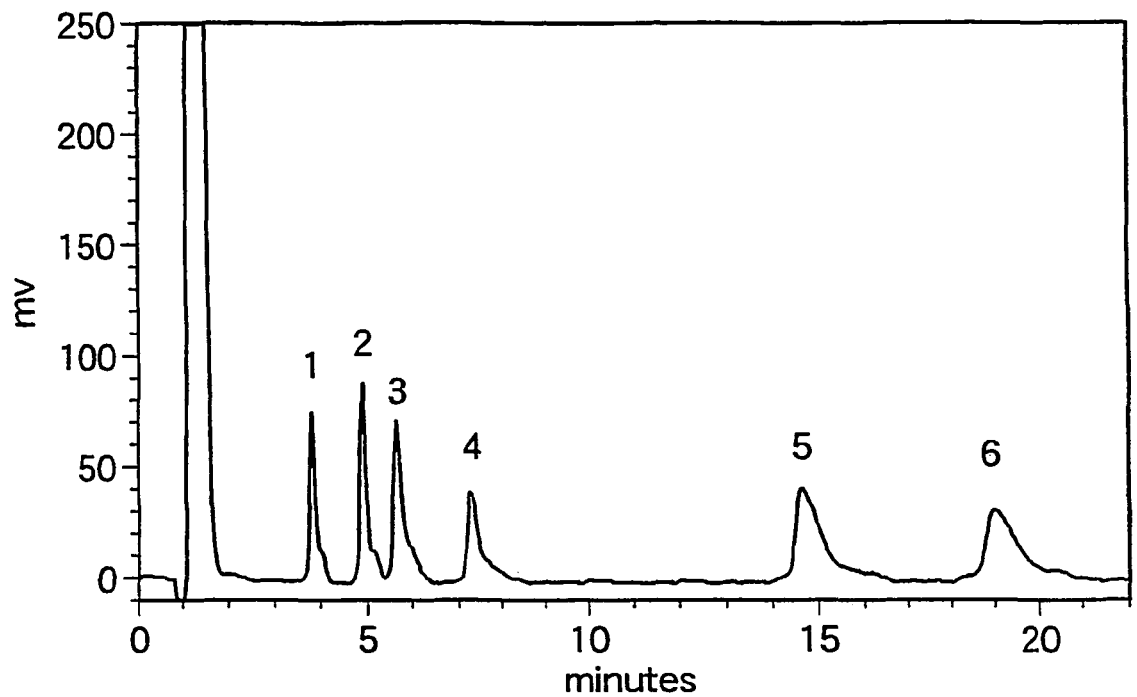
FIG. 1 is a chromatogram obtained as a result of Example 1; eluent: (5 mM tartaric acid/1 mM pyridine-2,6-dicarboxylic acid/24 mM boric acid).

The present invention, which has been accomplished as a result of studies on the production method of a weakly acidic cation exchanger, is a production process where a solvent incapable of dissolving a polymer having a double bond within the molecule is used and a weakly acidic cation exchanger is produced by polymerization under relatively mild conditions lower than the boiling point of the solvent. When an $\alpha,\beta$-unsaturated dibasic acid derivative is dissolved in the solvent, the $\alpha,\beta$-unsaturated dibasic acid derivative reacts with the polymer and a more firm film can be formed. Furthermore, when the weakly acidic cation exchanger obtained by this process is packed in a column, monovalent cation can be separated in a high level.

The film production process of the present invention comprises the following steps (1) and (2):

Step (1):
a step of coating a polymer having a double bond within the molecule on a support, and Step (2):
a step of placing the support coated with the polymer in a solvent incapable of dissolving the polymer coated, to cause a crosslinking reaction of the double bond within the molecule and thereby form a film.

The polymer having a double bond within the molecule used in the present invention is not particularly limited as long as the double bond thereof can react with a radical or the like to form a film on the support. In the present invention, it is also necessary to form a uniform film by the crosslinking reaction. Therefore, a polymer having many double bonds is preferred. In this respect, the polymer is preferably a polymer or copolymer of a divinyl compound or diene, or a polymer where a double bond is introduced by a reaction.

Examples thereof include an unsaturated carboxylic acid-diene monomer copolymer, an unsaturated carboxylic anhydride-diene monomer copolymer, a butadiene copolymer, a polybutadiene and a mixture of two or more thereof. Among these, preferred are poly(butadiene-maleic acid) (hereinafter, sometimes referred to as PBDMA), poly(butadiene-maleic anhydride) (hereinafter, sometimes referred to as PBDMAN) and polybutadiene. These polymers may be used individually or as a mixture of a plurality of polymers. In particular, PBDMA and PBDMAN are preferred. In general, these polymers are commercially available, for example, from PolyScience.

In the present invention, the polymerization of the polymer having a double bond within the molecule is performed in a solvent, but the polymerization method is not particularly limited. A radical polymerization initiator is preferably used to perform the polymerization under mild reaction conditions and either a thermal polymerization initiator or a photopolymerization initiator can be used. A thermal polymerization initiator such azobis-base compound and peroxide is preferred.

In the present invention, when an $\alpha,\beta$-unsaturated dibasic acid derivative is dissolved in the solvent used in the step (2), a novel film imparted with a new performance can be produced.

The $\alpha,\beta$-unsaturated dibasic acid derivative as used in the present invention means a derivative of a compound having a carboxyl group at both ends of an ethylenically polymerizable double bond. Examples thereof include a maleic anhydride, a maleic anhydride derivative (e.g., chloromaleic anhydride, citraconic anhydride, 1,2-diethylmaleic anhydride), a maleic acid, a maleic acid monoester, a maleic acid diester, a fumaric acid, a fumaric acid monoester, a fumaric acid diester and a maleimide. Among these, a maleic anhydride is preferred in view of both reactivity and industrial use.

The solvent for use in the present invention varies depending on the polymerization degree, crosslinking degree or the like of the polymer, but a solvent incapable of dissolving the polymer used is preferably selected. The solvent "incapable of dissolving" as used herein means a solvent where when the polymer is charged in the solvent, the polymer remains there in a short term without dispersing uniformly.

Whether the solvent is such a solvent can be confirmed by coating a polymer having a double bond within the molecule on an appropriate support such as slide glass, dipping the support in an objective solvent, heating it at a temperature on use and then observing the change in the weight. At this time, when the decrease in weight from that before dipping is 99% or less of the entire coated amount, this polymer can be used. The decrease in weight is preferably 50% or less, more preferably 10% or less. In the case of a polymer containing a low molecular oligomer, a method of previously removing the components soluble in a solvent and using only the undissolvable components in the next reaction may also be used.

The solvent for use in the present invention preferably dissolves an $\alpha,\beta$-unsaturated dibasic acid derivative. The dissolving property of the $\alpha,\beta$-unsaturated dibasic acid derivative in a solvent can be determined by the solubility. When expressed by a maximum mass of a solute which can dissolve in 100 g of a solvent, the solubility is preferably 0.01 g/100 g or more. Usually, a solvent having a solubility of 1 g/100 g or more is preferably selected. The same applies to the case where the $\alpha,\beta$-unsaturated dibasic acid derivative is liquid, but in the case where the $\alpha,\beta$-unsaturated dibasic acid derivative is liquid and the derivative and the solvent are not mixed, the $\alpha,\beta$-unsaturated dibasic acid derivative may be suspended by stirring and used in that state.

The organic solvent used in the reaction is not particularly limited as long as it does not dissolve the polymer having a double bond and causes no trouble in the crosslinking reaction. In the case of using an $\alpha,\beta$-unsaturated dibasic acid derivative, the solvent is selected from those which can dissolve it. The $\alpha,\beta$-unsaturated dibasic acid derivative can serve concurrently as the solvent. These solvents may be used individually or as a mixture. Examples thereof include benzene, toluene, xylene, propylene carbonate, tetrahydrofuran, methanol, ethanol, isopropanol and water.

Examples of the combination of the polymer having a double bond within the molecule and the solvent include PBDMA (obtained by drying an aqueous solution) with toluene or propylene carbonate, PBDMAN (obtained by drying an acetone solution) with toluene, and polybutadiene with propylene carbonate.

In the case of using the $\alpha,\beta$-unsaturated dibasic acid derivative, examples of the industrially advantageous combination include PBDMA and maleic anhydride with propylene carbonate, PBDMAN and maleic anhydride with toluene, and polybutadiene and maleic anhydride with propylene carbonate.

The method of coating a polymer having a double bond on a support is selected from commonly employed methods according to the shape of support. When the support is a plate or the like, a method of dipping the support in a solvent having dissolved therein a polymer having a double bond, then pulling it out and drying, thereby forming a film may be used. When the support is a porous spherical fine particle, a method of dispersing the support in a solvent having dissolved therein a polymer having a double bond and then removing the solvent by an evaporator may be used.

At this time, the amount of the polymer coated on the support is also not particularly limited but is selected according to use end of the film. In the case of producing a column packing material, the amount coated is, in terms of weight, preferably 0.1 to 3 times, more preferably from 0.25 to 0.8 times, to the amount of the porous spherical fine particle.

The $\alpha,\beta$-unsaturated dibasic acid derivative is usually added in an amount larger than the amount actually used for the reaction. For example, in the case of producing a column packing material, the amount of the $\alpha,\beta$-unsaturated dibasic acid derivative used is, in terms of weight, from 0.1 to 3 times, preferably from 0.5 to 1.5 times, to the amount of the porous spherical fine particle.

The reaction conditions when an $\alpha,\beta$-unsaturated dibasic acid derivative is added are not particularly limited as long as the $\alpha,\beta$-unsaturated dibasic acid derivative reacts with the polymer having a double bond. A method of using a radical polymerization initiator together and thereby producing an alternate copolymer is most simple and easy. The radical polymerization initiator may be either a thermal polymerization initiator or a photopolymerization initiator which are usually used. In particular, an azobis-base compound, a peroxide and the like are preferred. Specific examples thereof include 2,2'-azobisisobutyronitrile (hereinafter, sometimes referred to as AIBN), 2,2-azobis-(2,4-dimethylvaleronitrile), benzoyl peroxide, lauroyl peroxide and dicumyl peroxide.

In the production according to the present invention, another vinyl compound may also be present together in the solvent. The amount thereof is not particularly limited, however, if a vinyl compound which is readily polymerized by itself is used in a large amount, its graft polymer produced predominates in the polymer and this raises a problem that the crosslinking reaction of the polymer having a double bond becomes difficult to proceed. Furthermore, in the case of producing a weakly acidic cation exchanger, the film thickness of the weakly acidic cation exchanger obtained becomes large and probably because of this, poor separation results when the obtained weakly acidic cation exchanger is packed in a column. By taking account of such a case, the vinyl compound is added in an amount experimentally determined to exert the desired performance.

In the case of using an α,β-unsaturated dibasic acid derivative, among the vinyl compounds, a compound known to less undergo a polymerization by itself and cause an alternate copolymerization mainly with an α,β-unsaturated dibasic acid derivative (e.g., maleic anhydride) is preferably added so as to accelerate the crosslinking reaction of the α,β-unsaturated dibasic acid derivative. Also at this time, the vinyl compound is added in an amount experimentally determined to exert the desired performance.

In the production process of the present invention, as long as the steps (1) and (2) are contained, a different step may be provided before, after or between those steps. For example, a step for improving the property of film, such as heat treatment, may be performed after coating a polymer having a double bond on a support in the step (1) and followed by the reaction of the step (2). Furthermore, after this step, a step for converting the substituent in the resulting film into a desired form may also be performed. For example, when the substituent is in the form of an acid anhydride, this may be hydrolyzed under appropriate conditions.

In the production according to the present invention, a high temperature is not required and the reaction can be performed in an organic solvent. Therefore, the commonly employed apparatus and techniques can be utilized. Furthermore, the production is low in the danger and therefore, a porous organic polymer particle or the like can also be used industrially, a double bond or the like not reacted and remaining on the surface of the porous organic polymer particle causes a reaction with the polymer having a double bond or the α,β-unsaturated dibasic acid derivative and this is advantageous in that the film is firmly bonded to the support.

In the present invention, by reacting an α,β-unsaturated dibasic acid derivative, a weakly acidic cation exchanger capable of separating monovalent cation in a high level and usable in the simultaneous analysis of monovalent cation and divalent cation can be obtained.

The principle of the present invention is not clearly known, but it is presumed that by the reaction in a solvent of the step (2), a radical or the like of causing a reaction freely moves and the reaction of a double bond at the position easy to undergo a reaction is rendered to readily proceed. Needles to say, the elimination of danger, which is brought about by performing a decomposition reaction of radical initiator or the like in a solution due to use of a solvent, is an important feature of the present invention.

Furthermore, the α,β-unsaturated dibasic acid derivative by itself is generally difficult to give a polymer having a high molecular weight, but when used simultaneously with a polymer having a double bond, the reaction between the double bond of the polymer and the α,β-unsaturated dibasic acid derivative mainly proceeds and a weakly acidic functional group can be introduced in a high density into the film obtained, as a result, a weakly acidic cation exchanger of giving a high-level separation can be obtained.

In the case of producing a column for cation chromatography by using the weakly acidic cation exchanger of the present invention, the support used is an inorganic porous support such as silica gel, alumina, porous glass and carbon granule, or an organic porous support such as polystyrene gel, poly(meth)acrylic acid gel and polyvinyl alcohol gel. A support having a particle size of 1 to 30 μm and a pore size of 3 to 50 nm is preferred.

The particle coated with the polymer having a performance as a weakly acidic cation exchanger produced by the process of the present invention or the packing material using the same, particularly the packing material as a weakly acidic cation exchanger using a porous polyvinyl ether support or a porous silica gel support, can be packed into a column by an ordinary method to produce a column for cation chromatography.

EXAMPLES

In the packing material for cation chromatography produced by the process of the present invention, a film of a polymer compound containing a double bond could be produced without requiring special conditions such as high temperature. Furthermore, when the weakly acidic cation exchanger produced by this process was packed into a column, high-level separation of monovalent cation not achievable by the cation exchanger produced by other methods was exhibited.

The present invention is described below by referring to Examples and Comparative Examples.

Example 1

Production in Solvent by Using Silica Gel Support

A silica gel support (NUCLEOSIL® 100-5) (10 g) and 2.22 g of vinyltrimethoxysilane were charged into a separate flask with a condenser tube and thereto, 100 g of toluene was added. These were uniformly dispersed and while stirring, heated at 115° C. for 15 hours. The content was filtered, washed with methanol and acetone, and air-dried. As a result, 10.4 g of silica gel combined with vinylsilane was obtained.

Step (1):

In a 200 ml-volume eggplant type flask, 5.04 g of a 25% PBDMAN acetone solution, 4 g of silica gel obtained by the reaction above and 20 g of acetone were added and uniformly dispersed by irradiating an ultrasonic wave for 10 minutes. The obtained dispersion was left standing for 10 minutes and then concentrated while rotating at 40° C. and 50 mmHg in a rotary evaporator to form a film on the gel surface. The gel having formed thereon a film was transferred to a Petri dish and air-dried overnight. At this time, the weight of gel was 5.65 g.

Step (2):

Into a 100 ml-volume separate flask, 0.30 g of AIBN and 30 g of toluene were charged. Thereto, the gel having formed thereon a film was added and uniformly dispersed by irradiating an ultrasonic wave. After purging with nitrogen for about 30 seconds, the dispersion was reacted for 15 hours under heating at 85° C. with stirring. The reactant was filtered and the filtrate was washed with toluene and pure water. The gel obtained as a filtrate was further stirred in an aqueous 4 mM phosphoric acid solution at 85° C. for 1 hour and thereby hydrolyzed. The content was filtered and the filtrate was thoroughly washed in sequence with pure water and then with acetone and air-dried. In this way, 5.31 g of a weakly acidic cation exchanger was obtained. The amount of the functional group contained in this cation exchanger was determined as 2,189 μeq/g by titration.

The thus-obtained weakly acidic cation exchanger was packed in a separation column for liquid chromatography (inner diameter: 4.6 mm, length: 100 mm) and by using 5 mM tartaric acid/1 mM pyridine-2,6-dicarboxylic acid/24 mM boric acid as the eluent, separation of a sample was performed. The sample measured was a mixed solution having a concentration of $Li^+$: 0.2 mg/L, $Na^+$: 1 mg/L, $NH_4^+$: 1 mg/L, $K^+$: 2 mg/L, $Mg^{2+}$: 1 mg/L and $Ca^{2+}$: 2 mg/L, and 100 µL of this sample was injected. A conductivity detector was used for the detection.

Analysis Conditions:
Flow rate: 1.0 ml/min
Column temperature: 40° C.
Electric conductivity detector: TOA ICA-5220 (45° C.)

FIG. 1 shows the chromatogram obtained. In FIG. 1, the peak 1 is $Li^+$, the peak 2 is $Na^+$, the peak 3 is $NH_4^+$, the peak 4 is $NH_4^+$, the peak 5 is $Mg^{2+}$ and the peak 6 is $Ca^{2+}$. As seen from the comparison with FIG. 2, a column having the same performance as the column in the case of a high temperature treatment of Comparative Example 1 was obtained.

Example 2

Production by Using Silica Gel Support and Adding Maleic Anhydride

A silica gel support (NUCLEOSIL® 100-5) (10 g) and 2.22 g of vinyltrimethoxysilane were charged into a separate flask with a condenser tube and thereto, 100 g of toluene was added. These were uniformly dispersed and while stirring, heated at 115° C. for 15 hours. The content was filtered, washed with methanol and acetone, and air-dried. As a result, 10.4 g of silica gel combined with vinylsilane was obtained.

Step (1):
In a 200 ml-volume eggplant type flask, 5.04 g of a 25% PBDMAN acetone solution, 4 g of silica gel obtained by the reaction above and 20 g of acetone were added and uniformly dispersed by irradiating an ultrasonic wave for 10 minutes. The obtained dispersion was left standing for 10 minutes and then concentrated while rotating at 40° C. and 50 mmHg in a rotary evaporator to form a film on the gel surface. The gel having formed thereon a film was transferred to a Petri dish and air-dried overnight. At this time, the weight of gel was 5.54 g.

Step (2):
Into a 100 ml-volume separate flask, 3.0 g of maleic anhydride and 0.31 g of AIBN were charged and dissolved in 30 g of toluene. Thereto, the gel having formed thereon a film was added and uniformly dispersed by irradiating an ultrasonic wave. After purging with nitrogen for about 30 seconds, the dispersion was reacted for 15 hours under heating at 85° C. with stirring. The reactant was filtered and the filtrate was washed with toluene and pure water. The gel obtained as a filtrate was further stirred in an aqueous 4 mM phosphoric acid solution at 85° C. for 1 hour and thereby hydrolyzed. The content was filtered and the filtrate was thoroughly washed in sequence with pure water and then with acetone and air-dried. In this way, 5.28 g of a weakly acidic cation exchanger was obtained. The amount of the functional group contained in this cation exchanger was determined as 2,343 µeq/g by titration.

The thus-obtained weakly acidic cation exchanger was used for the analysis in the same manner as in Example 1 except for using 16 mmol phosphoric acid as the eluent.

Figure 3:
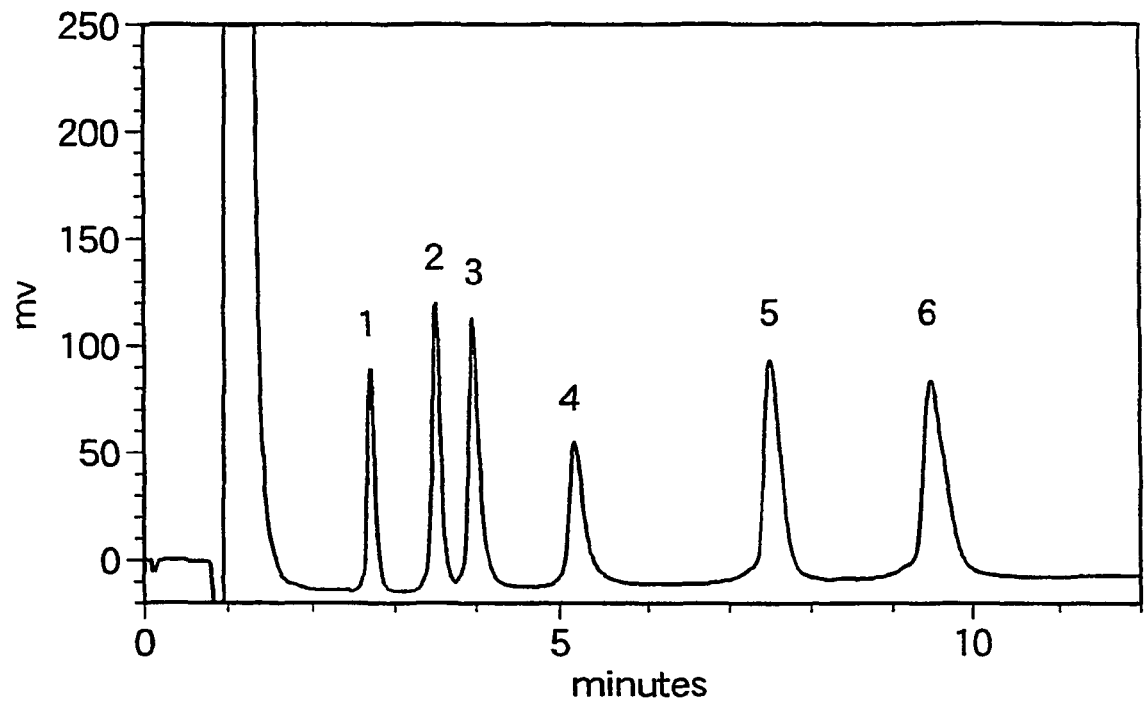
FIG. 3 is a chromatogram obtained as a result of Example 2; eluent: (16 mmol phosphoric acid)

FIG. 3 shows the chromatogram obtained. In FIG. 3, the peak 1 is $Li^+$, the peak 2 is $Na^+$, the peak 3 is $NH_4^+$, the peak 4 is $NH_4^+$, the peak 5 is $Mg^{2+}$ and the peak 6 is $Ca^{2+}$. The peaks of sodium and ammonium are satisfactorily separated from each other. In FIG. 3, sodium and ammonium show the base-line separation. As clearly seen from comparison with FIG. 4 using the same eluent, the separation width of this column is widened.

It is seen from the results in the production using a maleic anhydride that a column remarkably improved in the separation as compared with Example 1 and Comparative Example 1 is obtained.

Comparative Example 1

Crosslinking at High Temperature

Conventional Process (This is performed in accordance with the method described in JP-A-5-96184.)

(Step 1)
In a 200 ml-volume eggplant type flask, 5.04 g of a 25% PBDMAN acetone solution, 4 g of silica gel combined with vinylsilane used in Example 1, 0.4 g of maleic anhydride, 0.125 g of dicumyl peroxide and 30 g of acetone were added and uniformly dispersed by irradiating an ultrasonic wave for 10 minutes. The obtained dispersion was left standing for 10 minutes and then concentrated while rotating at 40° C. and 50 mmHg in a rotary evaporator to form a film on the gel surface. The gel having formed thereon a film was transferred to a Petri dish and air-dried overnight.

(Crosslinking):
The gel having formed thereon a film was sieved by using a 200-mesh stainless steel-made sieve and only the powder portion was transferred to a reduced pressure drier and after purging with a nitrogen, heated at 220° C. for 7 hours. Thereafter, the powder was cooled to room temperature and then stirred in an aqueous 4 mM phosphoric acid solution at 85° C. for 1 hour and thereby hydrolyzed. The content was filtered and the filtrate was thoroughly washed in sequence with pure water and then with acetone and air-dried. In this way, 4.63 g of a weakly acidic cation exchanger was obtained. The amount of the functional group contained in this cation exchanger was determined as 1,300 µeq/g by titration.

The thus-obtained weakly acidic cation exchanger was packed in a column for liquid chromatography and used for the analysis in the same manner as in Examples 1 and 2.

Figure 2:
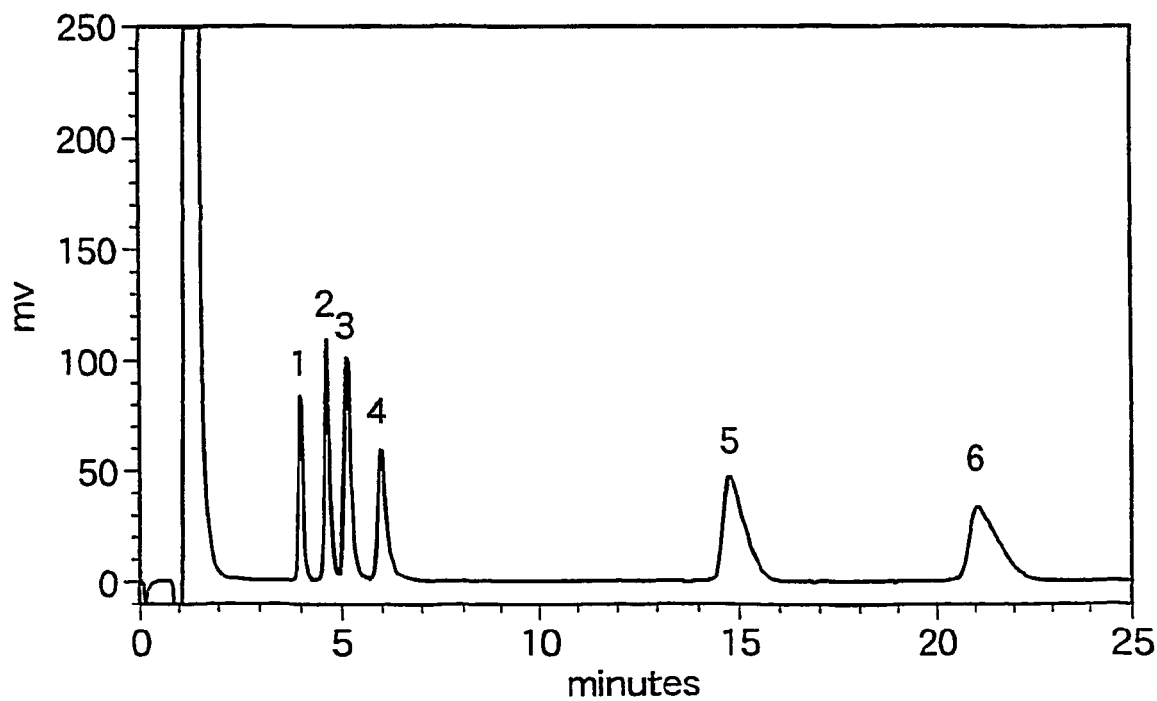
FIG. 2 is a chromatogram obtained as a result of Comparative Example 1; eluent: (5 mM tartaric acid/1 mM pyridine-2,6-dicarboxylic acid/24 mM boric acid).
Figure 4:
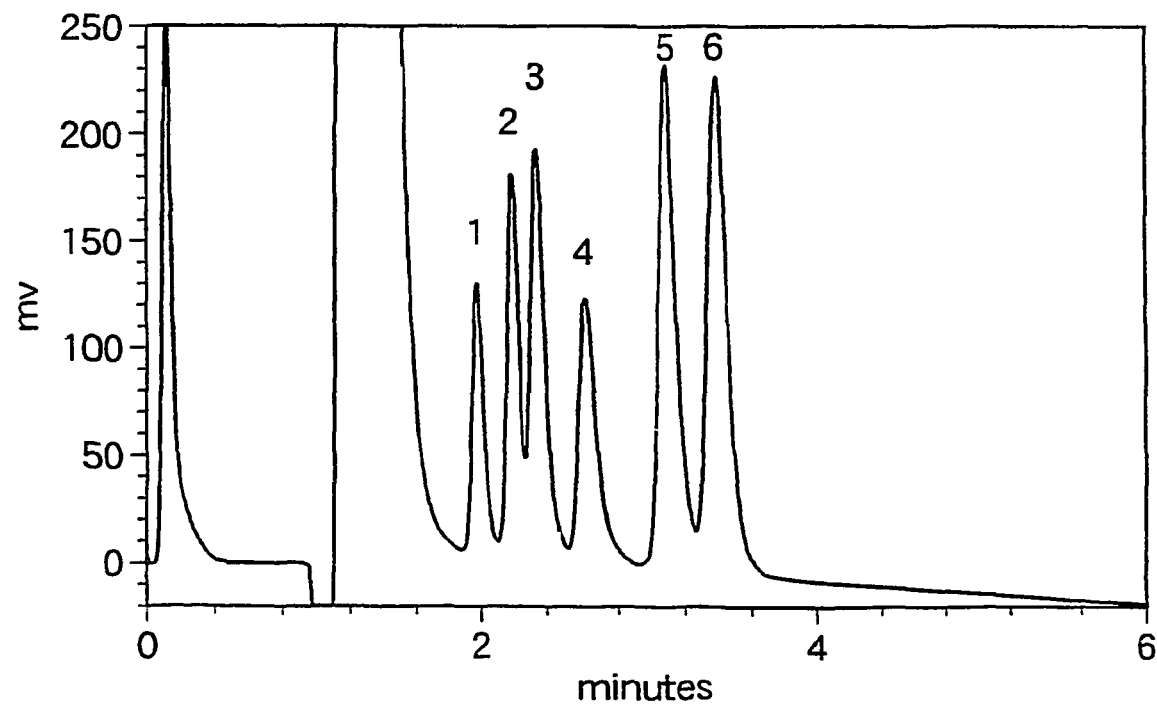
FIG. 4 is a chromatogram for comparison obtained by using the column of Comparative Example 1 and the same eluent (16 mmol phosphoric acid) as in Example 2.

FIGS. 2 (eluent: 5 mM tartaric acid/1 mM pyridine-2,6-dicarboxylic acid/24 mM boric acid) and 4 (eluent: 16 mM phosphoric acid) show the chromatograms obtained. In FIGS. 2 and 4, the peak 1 is $Li^+$, the peak 2 is $Na^+$, the peak 3 is $NH_4^+$, the peak 4 is $NH_4^+$, the peak 5 is $Mg^{2+}$ and the peak 6 is $Ca^{2+}$.

Example 3

Use of Organic Polymer Support

Polyvinyl Alcohol Gel (Production of Polyvinyl Alcohol Gel)
Into a 5 liter-volume three-neck flask equipped with a reflux condenser, a uniformly mixed solution containing 100 g of vinyl acetate, 180 g of triallyl isocyanurate, 150 g of butyl acetate and 10 g of AIBN, and 1,400 ml of water having dissolved therein polyvinyl alcohol and sodium phosphate each in a small amount were charged and stirred for 10 minutes. Subsequently, while stirring in a nitrogen stream, the polymerization was performed at 60° C. for 16 hours to obtain a particulate polymer. This polymer was filtered, washed, extracted with acetone and then dried.

Into a 5 liter-volume three-neck flask equipped with a reflux condenser, a nitrogen inlet tube and a stirrer, the polymer obtained and 3 liter of an aqueous 1N sodium hydroxide solution were charged together and stirred at 15° C. for 20 hours in a nitrogen stream, thereby performing the saponification, and then filtrated, washed with water and again dried. The concentration of the hydroxy group in the polyvinyl alcohol polymer obtained by saponification was 2.1 meq/g. In this way, a polyvinyl alcohol polymer having an average particle size of 5 μm was obtained.

Step (1):

In a 200 ml-volume eggplant type flask, 5.04 g of a 25% PBDMAN acetone solution, 4 g of the synthesized polyvinyl alcohol gel and 20 g of acetone were added and uniformly dispersed by irradiating an ultrasonic wave for 10 minutes. The obtained dispersion was left standing for 10 minutes and then concentrated while rotating at 40° C. and 50 mmHg in a rotary evaporator to form a film on the gel surface. The gel having formed thereon a film was transferred to a Petri dish and air-dried overnight. At this time, the weight of gel was 5.51 g.

Step (2):

Into a 100 ml-volume separate flask, 3 g of maleic anhydride and 0.1 g of AIBN were charged and dissolved in 30 g of toluene. Thereto, the gel having formed thereon a film was added and uniformly dispersed by irradiating an ultrasonic wave. After purging with nitrogen for about 30 seconds, the dispersion was reacted for 15 hours under heating at 85° C. with stirring. The reactant was filtered and the filtrate was washed with toluene and pure water. The gel obtained as a filtrate was further stirred in an aqueous 4 mM phosphoric acid solution at 85° C. for 1 hour and thereby hydrolyzed. The content was filtered and the filtrate was thoroughly washed in sequence with pure water and then with acetone and air-dried. In this way, 6.01 g of a weakly acidic cation exchanger was obtained.

The amount of the weakly acidic functional group was determined by dispersing the weighed gel in an aqueous 0.1 mmol potassium chloride solution and titrating it with 0.01N sodium hydroxide by taking the end point to a pH of 8 using an automatic titrator (AT-400, manufactured by Kyoto Electronics Manufacturing Co., Ltd.) and found to be 2,022 μeq/g.

The thus-obtained weakly acidic cation exchanger was packed in a separation column for liquid chromatography (inner diameter: 4.6 mm, length: 100 mm) and by using 4 mmol phosphoric acid as the eluent, separation of a sample was performed. The sample measured was a mixed solution having a concentration of $Li^+$: 0.2 mg/L, $Na^+$: 1 mg/L, $NH_4^+$: 1 mg/L, $K^+$: 2 mg/L, $Mg^{2+}$: 1 mg/L and $Ca^{2+}$: 2 mg/L, and 100 μL of this sample was injected. A conductivity detector was used for the detection.

Figure 5:
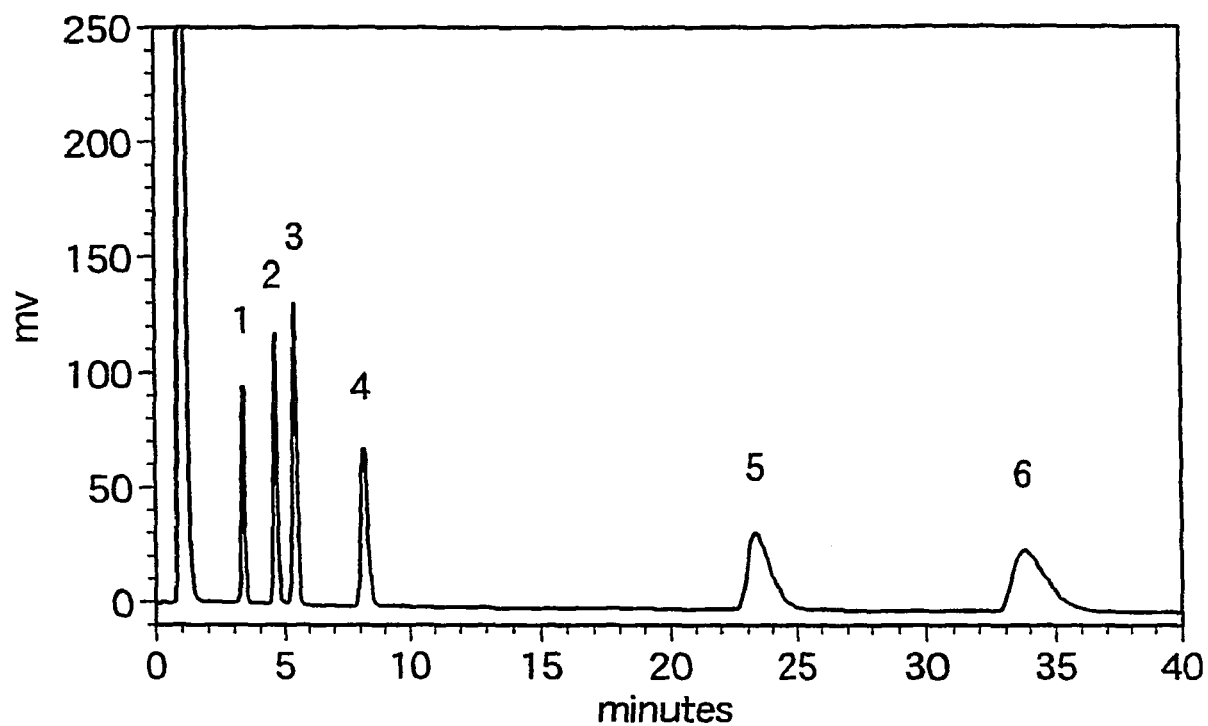
FIG. 5 is a chromatogram obtained as a result of Example 3; eluent: (4 mmol phosphoric acid).

FIG. 5 shows the chromatogram obtained. In FIG. 5, the peak 1 is $Li^+$, the peak 2 is $Na^+$, the peak 3 is $NH_4^+$, the peak 4 is $NH_4^+$, the peak 5 is $Mg^{2+}$ and the peak 6 is $Ca^{2+}$. It is seen that the separation of monovalent cation is broadened and in particular, sodium and ammonium are separated at the base line.

Example 4

Addition of Vinyl Compound

A cation exchanger was produced in the same manner as in Example 3 except for using 0.7 g of itaconic anhydride in place of maleic anhydride The weight of the weakly acidic cation exchanger obtained was 5.89 g and since it was 5.53 g when air-dried, the weight was increased by 0.36 g after the reaction.

The amount of the weakly acidic functional group was determined by performing the titration in the same manner and found to be 1,590 μeq/g. A column capable of cation analysis was obtained.

Example 5

PBDMA-Propylene Carbonate

A cation exchanger was obtained by performing an experiment in the same manner as in Example 3 except that a polyvinyl alcohol gel having an average particle size of 9 μm was used, 3 g of an aqueous 42% PBDMA solution was used in place of PBDMAN and a propylene carbonate was used as the reaction solvent. The amount of the functional group contained in this cation exchanger was determined as 1,717 μeq/g by titration.

Example 6

Polybutadiene-Toluene

A cation exchanger was obtained by performing an experiment in the same manner as in Example 2 except that a silica gel support (NUCLEOSIL® 100-5) was used in place of the silica gel combined with vinylsilane and 2 g of polybutadiene (85%, 1,2-adduct, molecular weight: 1,000) was used in place of the 25% PBDMAN acetone solution. The amount of the functional group contained in this cation exchanger was determined as 320 μeq/g by titration. This is considered to reveal the amount of a carboxyl group derived from the maleic anhydride introduced into the support by the reaction. As seen from this, even if polybutadiene is used, a film can be produced and a weakly acidic cation exchanger can be produced.

Example 7

Production of Film

To 10 g of a 25% PBDMAN acetone solution, 30 g of acetone was added. In this solution, a slide glass was immersed to the half and then gradually pulled up. This operation was repeated three times. The slide glass was dried, as a result, a PBDMAN film was produced on the surface thereof.

Into a long and narrow reaction vessel, 3 g of maleic anhydride and 0.3 g of AIBN were charged and dissolved in 40 g of toluene. Subsequently, the slide glass was placed therein to sink the PBDMAN film in the toluene solution and while stirring with a stirrer, the reaction was performed at 85° C. for 15 hours in a nitrogen atmosphere. Thereafter, the slide glass was immersed in an aqueous 4 mM phosphoric acid solution and treated at 85° C. for 1 hour. Then, the film was thoroughly washed with pure water and acetone and then dried. In this way, a film having a carboxyl group in a high density could be produced on a slide glass under mild conditions.

This film was carefully peeled off from the slide glass, as a result, a transparent film was obtained. This film was not dissolved even in acetone. Furthermore, when this film was immersed in an aqueous 1N sodium hydroxide solution and left standing for 30 minutes or more, the film was swelled but neither changed in its shape nor dissolved. A part of this film was cut off and dispersed in an aqueous 0.1 mmol potassium chloride solution and the dispersion was titrated with 0.01N sodium hydroxide by setting the end point to a pH of 8 while taking time much enough for the equilibrium. The result was 12.5 meq/g. This is a value between 11.8 meq/g as the theoretical value at the time of PBDMAN and 14.0 meq/g as the theoretical value when all double bonds of PBDMAN are crosslinked by a maleic acid, revealing that this film has a carboxyl group in a high density.

Example 8

An experiment was performed in the same manner as in Example 5 except that the maleic anhydride was not added.

The reactant was mostly dissolved out by washing but slightly remained on the slide glass.

When this reactant was dried and then peeled off from the slide glass, a film-like substance was obtained.

Comparative Example 2

Reaction of PBDMAN in Acetone with Maleic Anhydride

In 10 g of a 25% PBDMAN acetone solution, 0.72 g of maleic anhydride and 0.10 g of AIBN were added and dissolved. The resulting solution was reacted at 85° C. for 15 hours in a nitrogen atmosphere. In this way, a PBDMAN-maleic anhydride reactant was obtained as a gum-like solid. This reactant was further stirred in an aqueous 4 mM phosphoric acid solution and thereby hydrolyzed. The reactant was subjected to washing in sequence with pure water and with acetone but on the way of washing, the reactant was dissolved out while leaving a slight amount of soft insoluble matters. This is presumed to occur because PBDMAN is present in the solution state and therefore, the crosslinking by a maleic anhydride cannot satisfactorily proceed at the reaction.

INDUSTRIAL APPLICABILITY

According to the process of the present invention, a weakly acidic cation exchanger can be produced under relatively mild conditions lower than the boiling point of a solvent. Furthermore, the weakly acidic cation exchanger obtained in the co-presence of an $\alpha,\beta$-unsaturated dibasic acid derivative can separate monovalent cation in a high level when packed in a column.

The invention claimed is:

1. A film production process comprising the following steps (1) and (2):
   Step (1):
      a step of coating a polymer having a double bond within the molecule on a support, and
   Step (2):
      a step of placing the support coated with the polymer in a solvent incapable of dissolving the polymer coated, to cause a crosslinking reaction of the double bond within the molecule and thereby form a film
   wherein an $\alpha,\beta$-unsaturated dibasic acid derivative is present in the solvent used in the step (2).

2. The film production process as claimed in claim 1, wherein in the step (2), the polymer having a double bond within the molecule reacts with the $\alpha,\beta$-unsaturated dibasic acid derivative.

3. The film production process as claimed in claim 1, wherein the polymer having a double bond within the molecule is one or more member selected from an unsaturated carboxylic acid-diene monomer copolymer, an unsaturated carboxylic anhydride-diene monomer copolymer, a butadiene copolymer and a polybutadiene.

4. The film production process as claimed in claim 1, wherein the polymer having a double bond within the molecule is one or more member selected from a poly(butadiene-maleic acid), a poly(butadiene-maleic anhydride) and a polybutadiene.

5. The film production process as claimed in claim 1, wherein the $\alpha,\beta$-unsaturated dibasic acid derivative is a maleic anhydride and/or maleimide.

6. The film production process as claimed in claim 1 or claim 2, wherein the support is a spherical porous particle having a particle size of 1 to 30 μm.

7. The film production process as claimed in claim 6, wherein the spherical porous particle is a silica gel or a polyvinyl ether gel.

8. The film production process as claimed in claim 1 or claim 2, wherein the film is a weakly acidic cation exchanger.

9. A film produced by the production process in claim 1 or claim 2.

10. A weakly acidic cation exchanger produced by the production process in claim 1 or claim 2.

11. A column for cation chromatography, using the weakly acidic cation exchanger of claim 10.

* * * * *